UNITED STATES PATENT OFFICE.

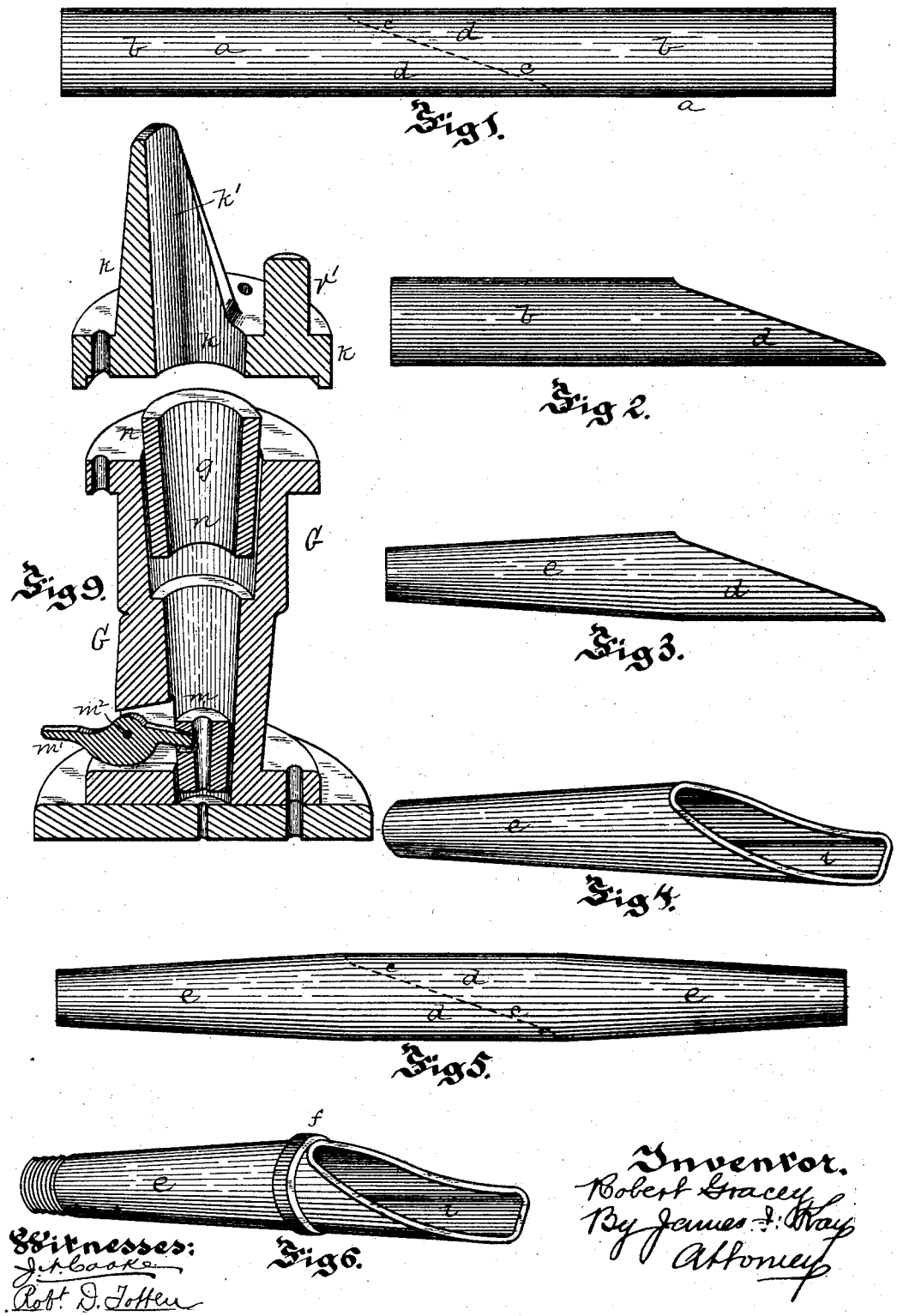

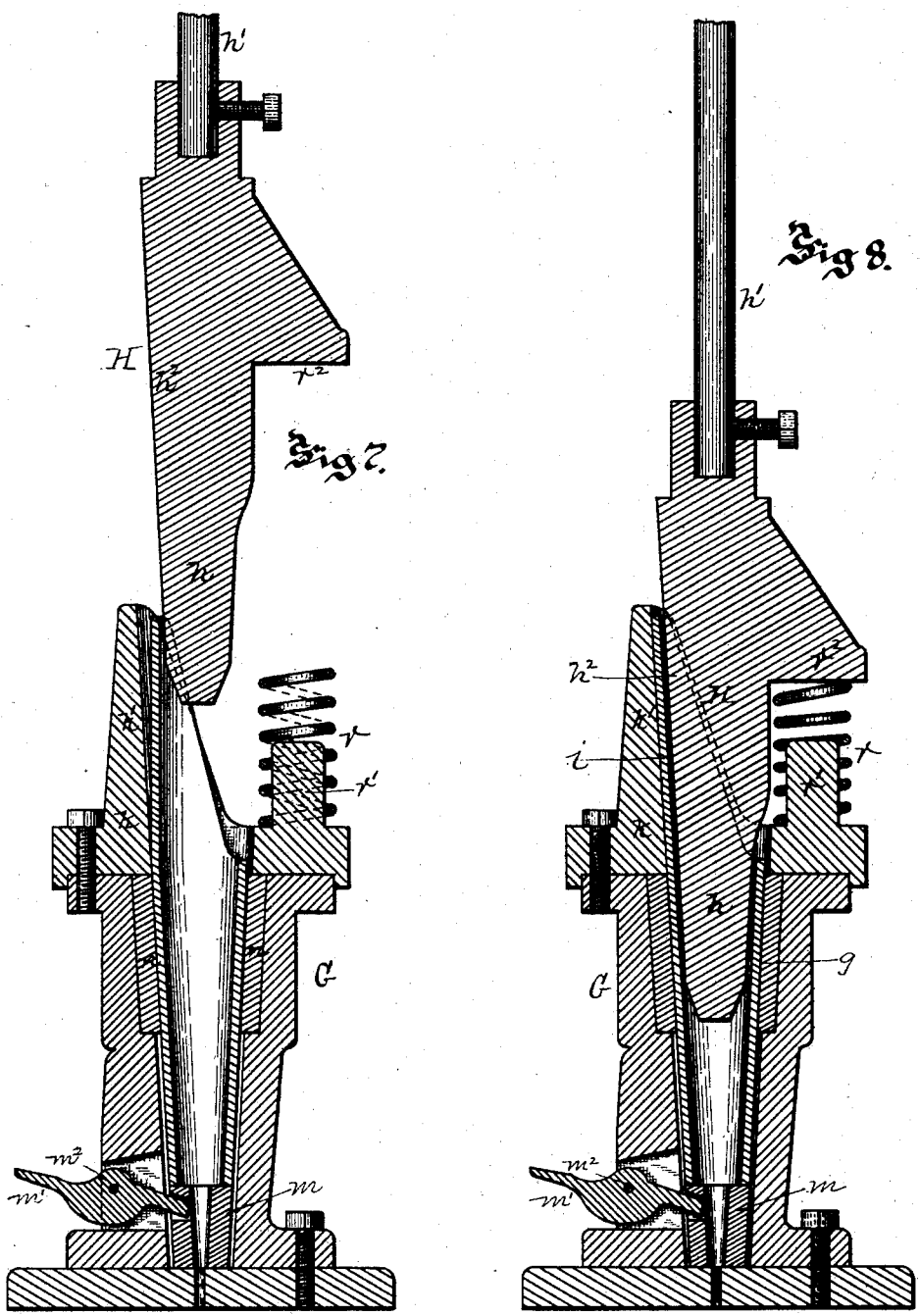

ROBERT GRACEY, OF ALLEGHENY CITY, PENNSYLVANIA, ASSIGNOR, BY DIRECT AND MESNE ASSIGNMENTS, TO WILLIAM F. PATTERSON, OF SAME PLACE.

MANUFACTURE OF AXLE-SKEINS.

SPECIFICATION forming part of Letters Patent No. 371,311, dated October 11, 1887.

Application filed November 17, 1886. Serial No. 219,157. (No model.)

*To all whom it may concern:*

Be it known that I, ROBERT GRACEY, of Allegheny City, in the county of Allegheny and State of Pennsylvania, have invented a new and useful Improvement in the Manufacture of Axle-Skeins; and I do hereby declare the following to be a full, clear, and exact description thereof.

My invention relates to the manufacture of axle-skeins from tubular-metal, and has special reference to certain improvements on the method of making such skeins, set forth in Letters Patent granted to me October 20, 1885, No. 328,481. The method set forth in the said patent consisted, essentially, in first swaging or reducing a blank of tubular metal the inside diameter of which corresponded to the greatest outer diameter of the axle, and after the said blank was tapered the large end of the blank had a portion cut away at an angle, so forming the tail of the skein, and the blank was then hammered to finish the tail and raise a shoulder against which the washer or collar abutted. In this manufacture, as the blank was tapered from one end to the other, it required that the blank be formed from a tube of as large diameter as the larger end of the blank so formed, and as the metal was cut away after it was tapered this metal was wasted, and it required the employment of a tube of substantially the full length of the finished skein from which to form each skein; and the object of the present invention is to overcome these objections to the manufacture of skeins from tubular metal, as set forth in said patent, and to further improve the manufacture of the same.

It consists, essentially, in forming the blanks for making the axle-skeins by cutting diagonally through a tube from which two blanks are formed, so as to form the tail portions of both skein-blanks from the same length of tubing, the cost of manufacture of the skeins being thus reduced by the saving in the length of tubing required to form them, and setting back this tail portion so as to be in proper line with the spindle portion of the finished skein.

It also consists in forming the skeins from the tubular metal by tapering or reducing the part of the blank forming the spindle or bearing of the finished skein, and then setting back the tail portion in proper line with the spindle portion, the blank, when so formed, being made from a tube corresponding in diameter only to the greatest diameter of the spindle portion of the skein, and consequently being made from a tube of less diameter than that employed in the manufacture of said skeins described in my said Letters Patent.

It also consists in apparatus for setting the tail portion of the blank to proper line with the spindle portion thereof, this apparatus having a mold or matrix corresponding to the outer shape of the finished skein and a former adapted to enter the blank and set its tail portion back against the mold.

It also consists in providing the mold with interchangeable inner shells and tail-molds, so that the same apparatus may be employed in the manufacture of different diameters and sizes of skeins.

It also consists in providing the mold with a vertically-movable base-block to support the base of the skein and to discharge it therefrom when finished.

It also consists in forming this base-block interchangeable to suit the different lengths of skeins.

It also consists in combining with the mold and the former a spring adapted to raise the former out of the skein after the setting operation, so preventing the finished skein from shrinking and binding around the former.

To enable others skilled in the art to practice my invention, I will describe the same more fully, referring to the accompanying drawings, in which—

Figure 1 is a side view of a tube adapted to form two skein-blanks, showing by dotted lines the manner of cutting the same therefrom. Fig. 2 is a like view of the blank cut from the tube. Fig. 3 is a like view of the blank after the spindle portion thereof is tapered or reduced. Fig. 4 is a perspective view of the finished blank, having the tail portion set in proper line with the spindle portion. Fig. 5 is a view of a tube for forming two skein-blanks, the spindle portion of such blanks having been tapered or reduced before the tail portions are cut apart. Fig. 6 is a perspective view of the finished skein with the collar thereon. Fig. 7 is a vertical section of the apparatus for setting the skein, showing the blank inserted therein before the setting operation. Fig. 8 is a like view showing the blank set to shape and the position of the former when said operation is finished; and Fig. 9 is a sectional perspective of the mold, showing the interchangeable parts thereof.

Like letters of reference indicate like parts in each.

In practicing my invention I take a tube, $a$, of sufficient length to form the spindle portions $b$ of the two skein-blanks and, in addition thereto, of a length sufficient to form the tail portion of one such blank, and by suitable tools—such as a saw or chisel—I cut the said tube along the dotted line $c$ diagonally through the tube, so forming the tail portions $d$ of the two blanks from the same length of tubing, and saving in the manufacture of the two skeins a length of metal corresponding to the length of one tail portion thereof, and therefore correspondingly reduce the cost of the finished skein. At present I perform this cutting operation by placing the tube $a$ on a rod or mandrel which is supported at both ends, and, after having marked on the tube, with chalk or other means, the line of the cut, commence to cut the tube at the point supported by the rod or mandrel with a cold-chisel, and as soon as the tube has been cut through at this point turn it on the rod, so as to present a fresh surface to the chisel, and so on until the tube has been severed on the line of demarkation into the two skein-blanks.

In practicing my invention I may either first cut the tube, as above described, to form the skein-blanks, as shown in Fig. 1, or I may first taper or reduce each end of the blank to form the spindle portions of the skein, as shown in Fig. 5, and subsequently cut the skeins apart by saw or suitable apparatus, as shown in Fig. 5. I prefer, however, to first cut the blanks from the tube, so obtaining a blank such as shown in Fig. 2, and then heat the part of this blank from which the spindle or bearing of the finished skein is formed, and by means of suitable reciprocating dies taper or reduce the portion $b$ thereof to form the tapering spindle portion $e$ of the blank, as shown in Fig. 3. This may be accomplished by any suitable swaging apparatus, that shown and described in Letters Patent No. 316,539, granted to me on the 28th day of April, 1885, being well adapted for this purpose. By this operation I obtain a blank such as shown in Fig. 3, the spindle portion being brought to the desired shape for the finished skein, but the tail portion $d$, as it is not tapered, being out of proper line with the spindle portion, it being well known that in these axle-skeins it is necessary that a set be given to the skein, so as to throw the wheel journaled on the axle on a slight incline, and by so doing bring the pressure directly on the spokes of the wheel and cause the wheel to press against the collar of the axle and relieve the retaining nut or linchpin by means of which it is secured on the axle from any great pressure from the wheel, and it is therefore necessary to set the tail portion $d$ in proper line with the spindle portion $e$. This I accomplish by the apparatus shown in Figs. 7, 8, and 9, the blank shown in Fig. 3 being placed within the mold G and a suitable former, H, entering within the blank and pressing the tail portion into proper line with the spindle portion, as shown at $i$, Figs. 4, 6, and 8, thus bringing the blank to finished shape, so that all that is necessary to form the finished skein is to secure the collar $f$ thereon and finish the smaller end thereof, providing it with a threaded portion or a linchpin hole to receive a nut or linchpin for the purpose of securing the wheel upon the axle.

The mold G is a vertical mold having at its upper end a tail-mold, $k$, the mold proper supporting the spindle portion of the blank, while the former H, in entering the blank, bends the tail portion back against the tail-mold $k$. The matrix $g$ of the mold G corresponds in shape to the tapering portion $e$ of the blank, and so acts to give a support thereto, the mold having at the base thereof the base-block $m$, upon which the smaller end of the skein-blank rests during the setting operation. This base-block is preferably made movable, so as to raise the finished blank from the mold, a suitable lever, $m'$, engaging with the base-block and acting to raise the same within the matrix of the mold. This base-block $m$ is made interchangeable, so that it can be withdrawn and a block of greater or less length inserted within the matrix, so as to support blanks of different lengths, all that is necessary to change the base-block being to withdraw the pivot-bolt $m^2$, remove the lever $m'$, lift the base-block out of the mold, insert one of proper size, and secure the lever $m'$ in place. In order to adapt the mold for different sizes or diameters of skein-blanks, I provide it with inner shells, $n$, the shells being removable and interchangeable, so that where it is desired to set a blank of greater or less diameter all that is necessary is to remove the inner shell and insert one having a cavity or matrix of a diameter suitable to support the blank to be set. This is more clearly shown in Fig. 8, where the several parts of the mold are shown separate and the manner of changing the same is illustrated. The inner shell, $n$, is held in place by the tail-mold $k$, which is bolted to the top of the mold proper, G, and is provided with a tail-piece, $k'$, the inner face of which corresponds in shape to the outer shape to be imparted to the tail of the skein, and the tail-molds are made interchangeable, so that they can be changed according to the blank to be set within the mold. The mold-face of the tail-mold and the interior face or matrix of the shell $n$ correspond with each other, so that when the blank is set therein the body of the blank is held firmly within the shell and the tail portion is pressed back into proper line with the tapering spindle portion of the blank.

The former H can be operated by any suitable power apparatus—such as by a drop—or it can be attached to the piston of a steam-cylinder and be forced by direct pressure into the mold, the piston-rod being shown at $h'$.

The former H corresponds in shape to the interior of the finished skein-blank, and in order to prevent the blank from bending out of shape it enters a short distance into the spindle portion thereof, as shown in Fig. 8, the base $h$ of the former corresponding in shape to the interior of the spindle portion of the blank and so acting to support the same, while the upper portion of the former, as at $h^2$, is formed of such shape as to press the tail portion $d$ back against the inner face of the tail-mold $k$, and so bend the tail portion into proper line with the spindle portion of the blank, this being clearly shown in Fig. 8. At the same time the former acts to flatten and widen the upper end of the tail portion and enable it to embrace a greater width of axle, the exact shape imparted to the tail being shown in Figs. 4 and 6. As the skein-blank is heated during the setting operation, it is evident that it would shrink upon and hold to the former unless the former were immediately lifted out of the blank after setting it, and practical experience has proven that even with a former operated directly by a steam or other pressure engine the former cannot be raised quickly enough to prevent the skein from shrinking around it.

To draw the former out of the skein as soon as the setting operation is over, I provide a spring, $r$, the spring being mounted on a suitable stud or pin, $r'$, on the mold, and the former having the shoulder $r^2$, which strikes against this spring when entering the mold and compresses the spring, so that as soon as the downward motion of the former ceases the spring acts to raise the same slightly and so releases it from the blank and prevents the shrinking or binding of the blank thereon.

In practicing my invention a tube of suitable length for the formation of two blanks is either first cut apart along the diagonal line $c$ (shown in Fig. 1) and the spindle portion $b$ tapered or reduced, as above described, so forming the blank shown in Fig. 3, or each end of the tube is tapered or reduced, as shown in Fig. 5, and the blank then cut apart along the dotted line $c$, Fig. 5, so forming the blank shown in Fig. 3. The tail portion of the blank so obtained is then heated and placed within the mold G, and the former H then enters the mold and presses the tail portion back against the inner face of the tail-mold $k$, thus finishing the blank, imparting to it the desired shape of the tail portion, and drawing the tail portion back into proper line with the spindle portion thereof. As the former descends, the shoulder $r^2$ strikes against the spring $r$ and compresses it, and as soon as the downward motion of the former ceases the pressure of the spring $r$ against the shoulder raises the former a short distance, so drawing it out of the skein-blank a sufficient distance to prevent the binding of the heated blank around the former. The former is then raised clear of the mold, and by pressure on the lever $m'$ the base-block $m$ is raised and the skein lifted out of the matrix of the mold a sufficient distance to enable the operator to grasp it with tongs and lift it out of the mold. All that is then necessary to finish the skein is to secure the collar $f$ thereon and provide it with a threaded portion for the reception of a nut at the lower end, or with a linchpin-hole for the reception of a linchpin to secure the wheel upon the axle.

To arrange the apparatus for setting skeins of different diameters or lengths it is only necessary to secure to the piston-rod $h'$ a former of proper size, place within the mold an inner shell, $n$, and secure to the mold a tail-mold, $k$, of proper size, and, if necessary, insert a base-block, $m$, of proper length, when the apparatus is in shape for the setting of the blank of different size.

What I claim as my invention, and desire to secure by Letters Patent, is—

1. The herein-described improvement in the manufacture of axle-skeins from tubular metal, consisting in cutting diagonally through a tube to form the tail portions of two skein-blanks from the same length of tubing, and subsequently setting back the tail portion so obtained in proper line for the finished skein, substantially as and for the purpose set forth.

2. The herein-described improvement in the manufacture of axle-skeins from tubular metal, consisting in tapering or reducing the part of the tube forming the spindle portion of the blank and then setting back the tail portion in proper line with the spindle portion, substantially as and for the purposes set forth.

3. The herein-described improvement in the manufacture of axle-skeins from tubular metal, consisting in cutting diagonally through a tube to form the tail portions of two skein-blanks from the same length of tubing, then tapering or reducing the part of the tube forming the spindle portion of the blank, and finally setting back the tail portion in proper line with the spindle portion, substantially as and for the purposes set forth.

4. In combination with a mold or matrix corresponding in shape to the outer form of the finished skein, the former adapted to set the tail portion of the blank back against the mold, substantially as and for the purposes set forth.

5. In molds for setting axle-skeins, the combination of the mold having a matrix corresponding in shape to the spindle portion of the skein and having a tail-mold corresponding in form to the finished tail of the skein, and a former adapted to enter the mold and press the tail portion of the blank against the tail-mold, substantially as and for the purposes set forth.

6. In molds for setting axle-skeins, the combination, with the mold proper, of an interchangeable inner shell and the interchangeable tail-mold, substantially as and for the purposes set forth.

7. The mold for setting axle-skeins herein described, having the matrix to receive the blank, and the vertically-moving base-block to discharge the skein after it is set, substantially as set forth.

8. The herein-described mold for setting axle-skeins, having the interchangeable base-block at the base of the matrix thereof, substantially as and for the purposes set forth.

9. In molds for setting axle-skeins, the combination of the mold to receive the blank, the former to set the same against the mold, and the spring to raise the former, substantially as and for the purposes set forth.

10. In molds for setting axle-skeins, the combination of the mold, the spring supported thereby, and the former provided with the shoulder adapted to press against the spring, substantially as and for the purposes set forth.

In testimony whereof I, the said ROBERT GRACEY, have hereunto set my hand.

ROBERT GRACEY.

Witnesses:
JAMES I. KAY.
ROBT. D. TOTTEN.